United States Patent [19]

Powers et al.

[11] 4,220,429
[45] Sep. 2, 1980

[54] INDEXABLE INSERT DRILL

[75] Inventors: Thomas R. Powers; Ricky L. Clark, both of Rogers, Ak.

[73] Assignee: TRW Inc., Cleveland, Ohio

[21] Appl. No.: 30,095

[22] Filed: Apr. 16, 1979

[51] Int. Cl.³ .................. B23B 51/00; B23B 31/10; B26D 1/12
[52] U.S. Cl. .................................. 408/224; 407/54; 407/40; 407/114; 408/57; 408/239 R; 408/713
[58] Field of Search .................. 408/58, 59, 186, 188, 408/189, 199, 206, 211, 217, 223, 224, 227, 228, 229, 238, 239, 713; 407/40, 42, 47, 48, 53, 54, 55, 60, 61, 102, 103, 113, 114, 115

[56] References Cited

U.S. PATENT DOCUMENTS

| | | | |
|---|---|---|---|
| 3,158,922 | 12/1964 | Reese | 407/54 |
| 3,540,323 | 11/1970 | Rishel | 407/40 |
| 3,816,018 | 6/1974 | Hlocky | 408/238 |
| 3,963,365 | 6/1976 | Shallenberger, Jr. | 408/186 |
| 4,072,438 | 2/1978 | Powers | 408/239 R |
| 4,124,328 | 11/1978 | Hopkins | 408/199 |
| 4,131,383 | 1/1979 | Powers | 407/114 |
| 4,149,821 | 4/1979 | Faber | 408/199 |

Primary Examiner—Harrison L. Hinson
Attorney, Agent, or Firm—Daniel G. Blackhurst

[57] ABSTRACT

An indexable insert drill having a cylindrical body with two flutes and a cutting insert mounted at the end of each flute. The cutting inserts are mounted so that each presents a cutting edge of a length less than the radius of the drill with each edge being positioned to provide negative lead and effectively neutral radial and axial rake. The first of the cutting edges intersects the longitudinal axis of the drill body and extends radially outward to an end area spaced inwardly from the circumference of the drill body. The second of the cutting edges extends from an outer end area radially outward of the drill body circumference to an inner end area radially inward of the radial outermost end of the first cutting edge. Preferably, the first cutting edge extends over two thirds of the radial dimension of the body and has an effective cutting length of at least twice that of the second cutting edge. Both cutting edges extend axially outward from the drill body and with at least a portion of the first cutting edge from its outer end area extending further axially outward than the second cutting edge outer end area.

16 Claims, 4 Drawing Figures

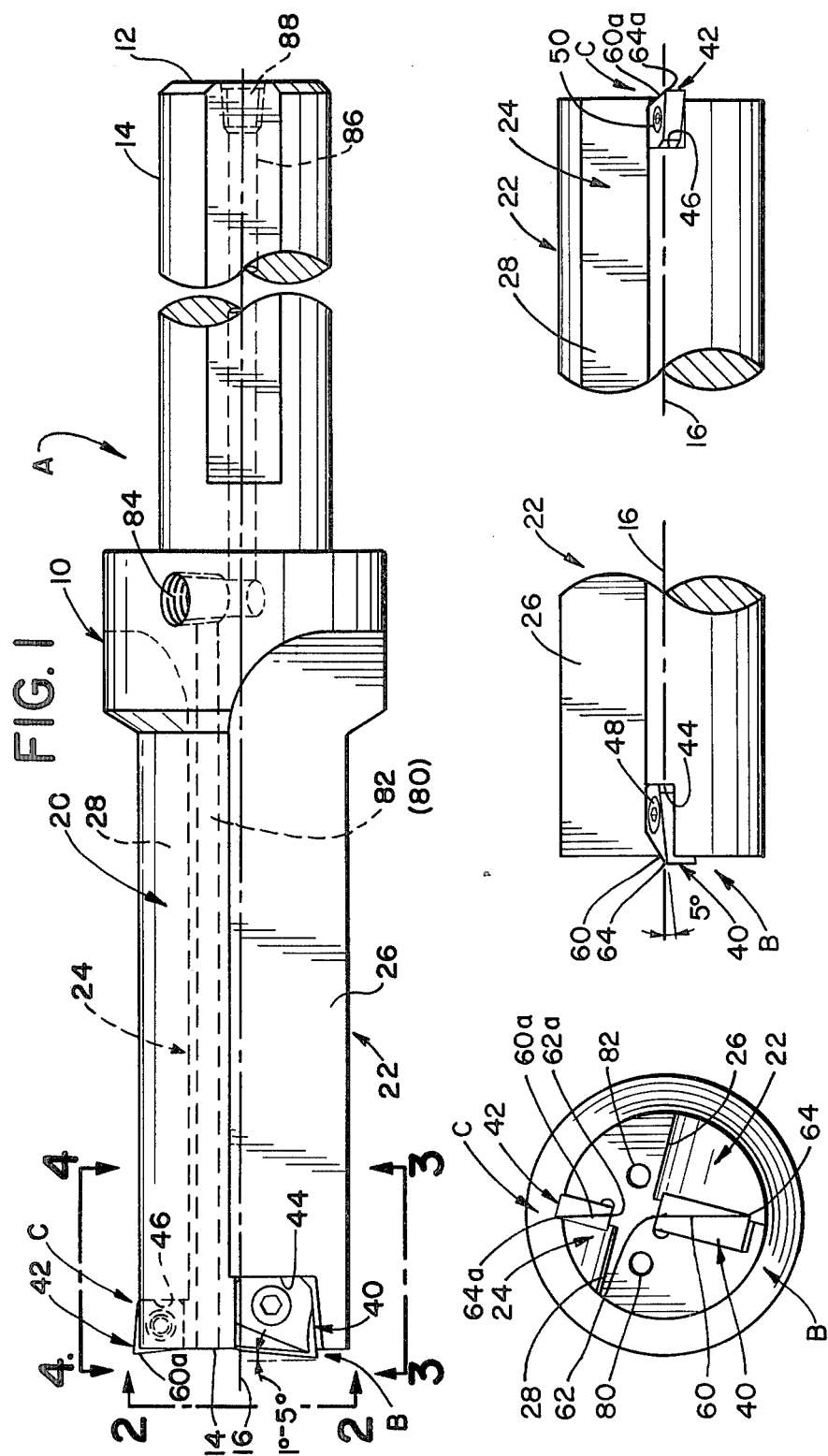

INDEXABLE INSERT DRILL

BACKGROUND OF THE INVENTION

The subject invention is directed toward the art of metal cutting tools and, more particularly, to an indexable insert type drill.

There has recently been a substantial interest in drills having cutting edges defined by indexable and replaceable inserts formed from carbide and the like. Typical of some of the more recent innovations for such drills are the arrangements shown in the commonly assigned U.S. Pat. Nos. 4,072,438 and 4,131,383 to Powers.

Generally, drills of the indexable type have proven successful for use in any number of materials although in many instances, they have not been particularly successful in drilling or machining steel. In addition, the nature of carbide as a cutting edge material presents problems when used under the conditions present in a drill. That is, the portion of the cutting edge at the center axis of the drill operates at an effective cutting speed of zero. Additionally, carbide generally requires great rigidity. Vibrations, interrupted cuts and the like contribute to comparatively quick breakdown of carbide cutting edges. These problems appear to be more prevalent when such drills are used in a drill rotating or dynamic condition as opposed to a work rotating or drill static condition.

The above conditions and factors have made it difficult to obtain the type of performance desirable from prior indexable insert type drills under certain operating conditions. The arrangements disclosed in the commonly assigned U.S. Pat. Nos. 4,072,438 and 4,131,383 to Powers have proved successful and have indeed overcome many of the aforementioned problems. Nevertheless, it has been desired to provide an indexable insert drill construction which would more fully balance the cutting forces encountered during a drilling operation. Such balancing is deemed to be particularly advantageous when the drill is to be used in a drill rotating or dynamic condition.

The subject invention meets the aforementioned needs and provides a new and improved indexable insert drill which provides improved results when used in a dynamic condition but which may also be used in the static condition. Moreover, the drill of the subject invention is adapted to use in a wide variety of drilling or material removal applications.

BRIEF DESCRIPTION OF THE INVENTION

The subject invention provides a new and improved indexable insert type drill which has been particularly successful at drilling from the solid in a drill rotating or so-called dynamic condition.

According to the present invention, the drill comprises an elongated generally cylindrical body having a longitudinal axis extending between the opposed ends thereof. A pair of flutes extend generally longitudinally from one end of the body with a cutting insert mounted adjacent the end of each flute. The inserts are mounted and arranged so that each provides a separate cutting edge lying in a radial plane of the body. The first of the cutting edges extends from the axis of the body to an end area spaced radially inward of the body circumference. The second cutting edge extends from an end area spaced outwardly of the body circumference to a position disposed radially inward of the outermost end area of the other cutting edge so that initial engagement between the drill and a workpiece is at only the one cutting edge.

In accordance with a more limited aspect of the invention, the cutting edges are each preferably provided with effectively neutral rake.

According to a further aspect of the invention, each cutting edge is positioned in a manner to have negative lead.

Preferably, and according to still another aspect of the invention, the first and second cutting edges are on diametrically opposite sides of the body longitudinal axis with the first cutting edge having an effective cutting length of at least twice that of the second cutting edge. This results in equalizing the force acting on the drill body to improve the dynamics thereof and to reduce the tendency for the drill to deflect.

According to yet a further aspect of the invention, at least a portion of the first cutting edge is spaced axially outward of the radially outermost end area of the second cutting edge. As a result, initial engagement of the drill with a workpiece takes place radially inward of the maximum tool diameter. This action permits the drill to be engaged with and guided by the workpiece prior to engagement thereof at the drill outer diameter.

A principal object of the present invention is the provision of a new and improved indexable insert drill employing a pair of inserts which each have a cutting edge.

Another object of the present invention is the provision of a new and improved indexable insert drill which balances the dynamics thereof during a drilling or other material removal operation and reduces any tendency for drill reflection.

Another object of the present invention is the provision of a new and improved indexable insert drill which is particularly suited for use in a drill rotating or dynamic condition but which is also adapted to use in a work rotating or drill static condition.

A further object of the present invention is the provision of a new and improved indexable insert drill which is adapted to a variety of drilling or material removal applications.

Still other objects and advantages for the invention will become apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part thereof and wherein:

FIG. 1 is a side elevational view of an indexable insert drill embodying the subject invention;

FIG. 2 is an end view taken along lines 2—2 of FIG. 1;

FIG. 3 is a bottom view taken along lines 3—3 of FIG. 1 showing one of the inserts and its mounting in some greater detail; and, FIG. 4 is a plan view taken along lines 4—4 of FIG. 1 showing the other insert and its mounting in some greater detail.

DESCRIPTION OF THE PREFERRED EMBODIMENT

Referring now to the drawings wherein the showings are for purposes of illustrating the preferred embodiment of the invention only and not for purposes of limiting same, the FIGURES show an indexable insert drill construction comprised of a drill body A and a pair of indexable inserts B, C. These inserts are substantially identical with those disclosed in the commonly assigned U.S. Pat. Nos. 4,072,438 and 4,131,383 to Powers. The teachings of these two commonly assigned patents are incorporated into this application by reference.

More particularly, and with reference to FIGS. 1 and 2, drill body A is comprised of an elongated, generally cylindrical main body 10 having opposed ends 12,14 and a longitudinal axis 16 extending between these ends. Body 10 may be formed from steel or any other suitable material capable of providing the required strength and rigidity for drilling operations. The body further includes a mounting end or shank portion 18 extending axially therealong from end 12 and a drill or cutting end portion 20 extending axially therealong from end 14.

Extending axially of body 10 in drill or cutting end portion 20 from end 14 are a pair of generally opposed grooves 22,24 which define flutes 26,28, respectively. Grooves 22,24 have, as best shown in FIG. 2, generally V-shaped cross sections in planes perpendicular to drill body longitudinal axis 16. Flutes 26,28 extend radially into drill or cutting end portion 20 a distance which allows proper cutting action for indexable inserts B, C as will become apparent hereinafter. However, these flutes should preferably be no larger than necessary to assure sufficient drill rigidity while still allowing sufficient space for proper chip flow.

Indexable inserts B, C are comprised of cutting insert bodies 40,42 which are formed from tungsten carbide or the like. Except for the relative sizes of these two inserts, their overall geometric configurations are identical and will be identified by like numerals with the inclusion of an "a" suffix on those numerals associated with cutting insert C. Moreover, the specific structural characteristics of insert bodies 40,42 do not, except as disclosed hereinafter, form a part of the present invention. Specific details of these bodies are disclosed in the above noted commonly assigned United States patents.

For the particular insert configuration utilized in the preferred embodiment of the subject invention, retaining pockets 44,46 are machined into drill end portion 20 adjacent the ends of grooves 22,24. Each of these pockets has a bottom wall and a pair of side walls which join the bottom wall at substantially 90° angles. This angular relationship permits the inserts to be rigidly locked in their associated pocket through the use of simple mechanical fastening means such as screws 48,50 (FIGS. 3 and 4). This arrangement also facilitates a smooth transition between the top surfaces of cutting insert bodies 40,42 and the bottom surface of flutes 26,28, respectively, for obtaining proper chip flow.

The relative positioning of cutting edges 60,60a of bodies 40,42 radially and axially of each other and of drill body A is particularly significant to obtaining the desired operational results from the subject invention. As best shown in FIG. 2, these cutting edges extend exactly on a radius of body cutting end portion 20 and are thus aligned with each other diametrically of the end portion. Cutting edges 60,60a extend from the innermost end areas or points 62,62a to outermost end areas are points 64,64a, respectively, as is best shown in FIG. 1. As is also best shown in FIG. 1, each cutting insert body is contoured and/or located such that cutting edges 60,60a thereof provide the drill with a negative lead. More particularly, radially outermost end areas or points 64,64a are located axially outward of the end of body cutting end portion 20 a greater distance than the radial innermost ends or points 62, 62a. While the amount of this negative lead could be varied, the preferred embodiment here under discussion contemplates a negative lead preferably in the range of approximately 1° to 5°. In addition to the aforementioned negative lead, the inserts are preferably positioned so that cutting edges 60,60a have effective neutral cutting rake.

With reference to FIG. 2, it will be seen that cutting edge 60 has a length greater than cutting edge 60a. In the preferred embodiment, cutting insert body 40 is positioned so that cutting edge 60 has innermost end area 62 disposed at body longitudinal axis 16 and outermost end area 64 spaced radially inward from the outer circumference of body cutting end portion 20. In the preferred arrangement, cutting edge 60 extends over at least ⅔ of the radial dimension of cutting end portion 20. Further, cutting insert body 42 is positioned so that cutting edge 60a thereof has its innermost end area 62a spaced radially inward of outermost end area 64 of cutting edge 60 with outermost end area 64a extending radially outward of the body cutting end portion 20 circumference. Preferably, the overall length of cutting edge 60 is at least twice that of cutting edge 60a.

The maximum radial extent of cutting edge 60a at outermost end area is slightly greater than the maximum radial extent of body cutting end portion 20. As best seen in FIG. 1, this cutting edge outermost end area provides clearance for body cutting end portion 20. Preferably, this clearance, designated x in the FIGURE, should be minimized to prevent chips from packing between the body cutting end portion and the wall of a hole being machined when the indexable insert drill is being used as a drill. In addition, innermost end area 62 of cutting edge 60 is chamfered to provide better distribution of forces at the corner area. This reduces the possibility of failure of the cutting edge at innermost end area 62 since the center axis of the drill operates at an effective cutting speed of zero. Although the amount of such chamfer may be varied, an angle generally in the range of 30° to 60° is normally preferred. Outermost end areas 64,64a are both slightly radiused to improve the cutting action, particularly when used for drilling. Again, the overall configurations of cutting insert bodies 40,42 are identical so that the above specifically noted structural characteristics are typically included on both although such characteristics are only pertinent as noted.

Referring again to FIG. 1, it will be noted that cutting edges 60,60a extend axially outward of body cutting end portion 20 at end 14. Moreover, at least outermost end area 64 of cutting edge 60 extends further axially outward than outermost end area 64a of cutting edge 60a. In the preferred arrangement here under discussion, the axial distance between outermost end areas 64,64a is generally in the range of from 0.005 to 0.010" (1.27-2.54 mm.). In addition, the entirety of cutting edge 60 between end areas 62,64 thereof preferably extends further axially outward from cutting portion 20 than outermost end area 64a of cutting edge 60a. The benefits derived from this relationship will become more readily apparent hereinafter although the specifics thereof may be varied to some extent.

With continued reference to FIG. 1 and with secondary reference to FIG. 2, it is important to provide an adequate supply of coolant to cutting edges 60,60a during a drilling or other material removal operation. To that end, main body 10 includes generally longitudinally extending coolant passageways 80,82. These two passageways communicate between body end 14 and an inlet port 84 penetrating the side wall of main body 10. Of course, a single elongated passageway extending from inlet port 84 and terminating in a pair of outlet branches adjacent body end 14 could also be advantageously utilized. Another coolant passageway 86 extends longitudinally of main body 10 from inlet port 84 to a second inlet port 88 disposed at main body end 12. Either of ports 84,88 can be used for coolant supply and the choice thereof is primarily dependent upon the type of machine on which the indexable insert drill itself is mounted. The non-used port is conveniently plugged. Coolant discharge is generally axially outward of the drill body at body end 14 through coolant passageways 80,82. The coolant is typically supplied at relatively high pressure for assisting in moving chips away from the cutting action. Coolant flow is also important at generally the area of drill body center axis 16 since cutting edge 60 approaches a cutting speed of zero surface feet per minute at innermost end area 62 thereof.

The subject invention is particularly useful in drilling a hole from the solid in steels as well as other ferrous and non-ferrous metals and alloys under a drill rotating or dynamic condition. In use, and as rotating cutting edges 60,60a are brought toward drilling engagement with a workpiece, cutting edge 60 is the first to actually engage the workpiece. As a result, initial cutting takes place radially inward of the maximum tool diameter. This action permits the drill to be engaged with and guided by the workpiece itself prior to cutting engagement thereof at the drill outer diameter by cutting edge 60a. Such action facilitates a more stable drilling action to allow somewhat improved drilling results to be obtained.

As previously noted, cutting edges 60,60a are on diametrically opposite sides of axis 16 with cutting edge 60 having an effective cutting length of at least twice that of cutting edge 60a. Because of this dimensional relationship, the fact that cutting insert body 40 is larger than cutting insert body 42 and the fact that cutting insert body 40 is more closely radially spaced to body longitudinal axis 16 than cutting insert body 42, the overall result is to equalize forces acting on the drill body. This, in turn, improves the drill dynamics during operation and reduces the tendency for the drill to deflect. The overall arrangement and relationships described above have been found to provide improved results for an indexable insert drill over results obtainable from prior known drills, particularly when it is used in a drill rotating or dynamic condition.

While the subject invention is particularly designed for use in drilling holes in the solid under dynamic operating conditions, the tool is also equally useable for such drilling in a workpiece rotating or tool static condition. Still further, the subject indexable insert drill may also be used to perform a variety of other material removal functions such as turning, boring, facing, contouring and the like. Such alternative applications would be somewhat similar to those described in the aforementioned commonly assigned United States patents.

Finally, cutting insert bodies 40,42 may be configured to each include a second cutting edge (not shown). These second cutting edges may be indexed into a cutting position by simply inverting and rotating the inserts themselves. The second cutting edges are identical to the first as described in detail in U.S. Pat. Nos. 4,072,438 and 4,131,383.

The invention has been described with reference to the preferred embodiment. Obviously, modifications and alterations will occur to others upon the reading and understanding of the specification. It is my intention to include all such modifications and alterations insofar as they come within the scope of the appended claims or the eqivalents thereof.

Having thus described our invention, we now claim:

1. An indexable insert drill comprising:
   an elongated, generally cylindrical body having a longitudinal axis extending between first and second terminal body ends, a portion of said body adjacent said first end comprising a shank portion and a portion of said body adjacent said second end comprising a drilling portion;
   first and second grooves extending axially of said body along at least a section of said drilling portion with each of said grooves extending to said second end and terminating in an insert receiving pocket; and,
   a cutting insert disposed in each said pocket, each insert having a cutting edge of a length less than the radius of said second end extending radially of said body at a location axially outward of said second end with a negative lead and substantially neutral radial and axial rake, the cutting edge on one of said inserts extending from the longitudinal axis of said body to an outermost end spaced at least two thirds the distance along the radial dimension of said body second end and the cutting edge of the other of said inserts extending at least from a point radially inward of said one insert cutting edge outermost end to an outermost end at least slightly beyond the radial outermost area of said body second and, at least said one insert cutting edge outermost end being located further axially outward than said other insert cutting edge outermost end.

2. The drill as defined in claim 1 wherein said one insert cutting edge has a length at least twice as great as said other insert cutting edge.

3. The drill as defined in claim 2 wherein said cutting edges are aligned with each other diametrically of said body.

4. The drill as defined in claim 3 wherein said one and said other insert cutting edges are axially spaced apart by a distance generally in the range of 0.005" to 0.010".

5. An indexable insert drill comprising:
   an elongated, generally cylindrical body having first and second ends adapted to be rotated about a longitudinal axis extending between said ends, said body including a pair of flutes extending generally axially along at least a portion of said body from said first end; and,
   a cutting insert mounted to each flute adjacent said body first end with each insert having a cutting edge of a length less than the radius of said body and lying in a radial plane of said body at a location axially outward of said first end, a first of said cutting edges passing through said body longitudinal axis to an outermost end radially spaced therefrom and the second of said cutting edges extending from an outermost end disposed radially outward of said body to a point disposed radially inward of said first cutting edge outermost end, each of said cutting edges being positioned to provide said drill with negative lead and with said first cutting edge outermost end extending further axially outward of said body first end than said second cutting edge outermost end.

6. The drill as defined in claim 5 wherein said cutting edges have effectively neutral radial and axial rake.

7. The drill as defined in claim 5 wherein said first cutting edge is positioned such that during a drilling operation on a workpiece, it engages said workpiece throughout a portion of its length by an amount equal to at least twice the length of said second edge in engagement with said workpiece.

8. The drill as defined in claim 5 wherein the axial distance between said first cutting edge outermost end and said second cutting edge outermost end is at least approximately 0.005".

9. The drill as defined in claim 5 wherein said first and second cutting edges are in alignment with each other across a diameter of said body.

10. The drill as defined in claim 5 wherein the radial outermost ends of said first and second cutting edges are each provided with a radius.

11. The drill as defined in claim 5 wherein at least said first cutting edge is chamfered at its radial innermost end.

12. In an indexable insert drill comprised of an elongated, generally cylindrical body having a longitudinal axis and a first end portion including an elongated flute in which an indexable cutting insert is fixedly mounted to effect material removal when said cutting insert communicates with a workpiece and one of said drill and workpiece is rotated relative to the other, the improvement comprising:

said body first end portion including a pair of elongated flutes each having a cutting insert fixedly secured thereto so that a cutting edge thereon extends axially outward of said body first end portion in a radial plane thereof; the cutting edge of one of said inserts being disposed to pass radially at least from said body longitudinal axis to an outermost end spaced inwardly from the side area of said body first portion and the cutting edge of the other of said inserts extending from an area disposed radially inward of said one insert cutting edge outermost end to an other insert outermost end disposed radially outward of said body first end portion; and, the cutting edges of said one and said other inserts being aligned with each other diametrically of said body and extending axially outward different distances from said body first end portion.

13. The improvement as defined in claim 12 wherein the outermost end of said one insert cutting edge is radially spaced from said body longitudinal axis by an amount equal to at least two thirds of the radius of said body first end portion.

14. The improvement as defined in claim 12 wherein said one insert cutting edge has a length at least twice as great as said other insert cutting edge.

15. The improvement as defined in claim 12 wherein the outermost end of said one insert cutting edge extends further axially outward from said body first end than the outermost end of said other insert cutting edge by at least approximately 0.005".

16. The improvement as defined in claim 12 wherein said cutting edges are positioned to provide said drill with negative lead and effective neutral radial and axial rake.

* * * * *